United States Patent
Carsello et al.

(10) Patent No.: US 8,139,694 B2
(45) Date of Patent: Mar. 20, 2012

(54) METHOD FOR REDUCING POWER CONSUMPTION WHEN RECEIVING PAGING CHANNEL INFORMATION AT A MOBILE COMMUNICATION DEVICE

(75) Inventors: Stephen R. Carsello, Plantation, FL (US); Mark A. Goldberg, Davie, FL (US); Chin P. Wong, Parkland, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 987 days.

(21) Appl. No.: 11/697,838

(22) Filed: Apr. 9, 2007

(65) Prior Publication Data

US 2008/0132297 A1    Jun. 5, 2008

Related U.S. Application Data

(60) Provisional application No. 60/867,949, filed on Nov. 30, 2006.

(51) Int. Cl.
*H04B 1/00* (2006.01)
*H04L 27/00* (2006.01)

(52) U.S. Cl. .................................................... 375/347

(58) Field of Classification Search .................. 375/316, 375/346, 347, 349
See application file for complete search history.

(56) References Cited

U.S. PATENT DOCUMENTS

| | | | |
|---|---|---|---|
| 6,654,408 B1 | 11/2003 | Kadous et al. | |
| 6,654,429 B1 | 11/2003 | Li | |
| 7,027,527 B2 * | 4/2006 | Krauss et al. | 375/316 |
| 2003/0053412 A1 * | 3/2003 | Yoshida et al. | 370/208 |
| 2003/0086371 A1 | 5/2003 | Walton et al. | |
| 2004/0120304 A1 | 6/2004 | Kloos et al. | |
| 2006/0141961 A1 * | 6/2006 | Schentrup et al. | 455/133 |

OTHER PUBLICATIONS

3GPP, "3rd Generation Partnership Project: Technical Specification Group GSM/EDGE Radio Access Network; Radio Transmission and Reception (Release 1999)", 3GPP TS 05.05 V8.20.0, Nov. 11, 2005, pp. 1-100, Sophia Antipolis, Valbonne, France.

* cited by examiner

*Primary Examiner* — Kevin M Burd
(74) *Attorney, Agent, or Firm* — Scott M. Garrett; Sylvia Chen

(57) ABSTRACT

A mobile communication device (100) includes a receiver (102) which is normally shut off when the mobile communication device is idle. Upon the arrival of a paging time slot to which the mobile communication device is assigned, the mobile communication device turns on the receiver and begins receiving a composite signal including frequency diverse subchannels. The mobile communication device measures the delay spread of the subchannels (406). The receiver then adjusts the receiver on time for the next time slot based on the delay spread of the present time slot.

11 Claims, 5 Drawing Sheets

METHOD FOR REDUCING POWER CONSUMPTION WHEN RECEIVING PAGING CHANNEL INFORMATION AT A MOBILE COMMUNICATION DEVICE

CROSS-REFERENCE TO RELATED APPLICATION

The present application claims the benefit of U.S. Provisional Application Ser. No. 60/867,949, filed Nov. 30, 2006, which is hereby incorporated by reference thereto.

TECHNICAL FIELD

This invention relates in general to signal processing for mobile communication devices, and more particularly to the use of signal processing for determining when a receiver of the mobile communication device may be shut off, while receiving an assigned page slot, to conserve battery power.

BACKGROUND OF THE INVENTION

Battery life is an important aspect of marketing mobile communication devices. Battery life is often expressed in terms of "talk time" or "stand by time." It is desirable to provide longer operating times between recharge cycles, or before changing the battery of the mobile communication device. Consequently, manufacturers are constantly trying to reduce the power consumption rates of mobile communication device with each successive design.

The transmitter of a mobile communication device operates at a high power level when transmitting, but a significant power level is required when receiving as well. Reducing the amount of time the receiver needs to be on will therefore reduce the power consumption of the mobile communication device. Accordingly, it is typical that the transmitter and receiver be put into a low power state until needed.

Typically in mobile communication systems when the mobile communication device is not involved in a call it still must periodically monitor for incoming calls or other signals. In time divisioned, multiple access systems, the mobile communication device is typically assigned to a paging channel, and periodically must power up the receiver to receive a transmission from the communication system. Typically the paging transmission includes a slot descriptor block which indicates the nature of the information in the payload of the paging frame. The slot descriptor block also includes expected symbols, such as pilot symbols, which may be used for channel estimation.

Even if the slot descriptor block indicates the payload of the present frame has no data, the receiver is not shut off at the end of the slot descriptor block because, in addition to receiving the information regarding payload in the slot descriptor block, there are additional expected symbols beyond the slot descriptor block the mobile communication device receives to perform channel estimation in less than optimal signal conditions. These additional symbols embedded in the payload section must be received, especially in poor channel conditions, to maintain good channel estimation, even when there is no useful information in the payload for the mobile communication device. But under good signal conditions, it may not be necessary to receive more symbols than those in the slot descriptor block. Therefore there is a need for a way to shut off the receiver prior to the end of the receive time slot without losing performance.

DETAILED DESCRIPTION

Figure 1:
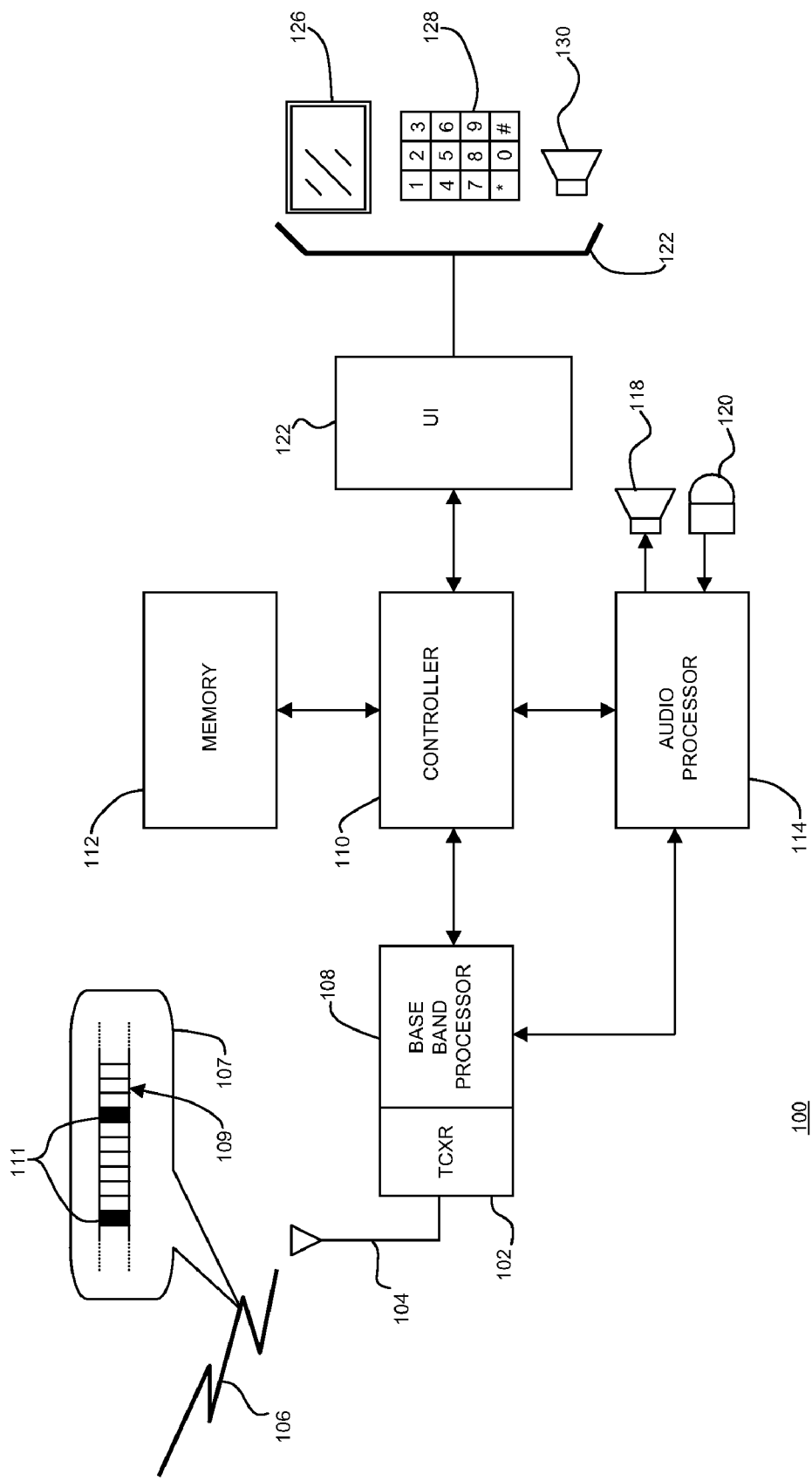
FIG. 1 shows a block schematic diagram of a mobile communication device, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of determining if and when the receiver may be shut down when receiving, for example, a page monitoring frame, by measuring the fading across subchannels. The fading refers to the frequency fading of the subchannels, relative to each other. According to the invention, the fading may be determined by computing cross correlations of expected symbols, typically referred to as pilot symbols, occurring concurrently, or substantially concurrently, in the subchannels. In this context, the expected symbols are concurrent with regard to order or position within their respective subchannels, but not necessarily with regard to time because fading may cause a time difference among subchannels. If the fading measurement indicates the fading is sufficiently low, then the subchannels are sufficiently synchronized to allow accurate channel estimation, and the mobile communication device may shut off the receiver in a present or subsequent time slot after receiving the initial portion of the frame without having to receive all the information during the remaining present or subsequent time slot, assuming there is no more payload to be received. For example, in one embodiment of the invention, the mobile communication device monitors a paging channel at an assigned frame time slot. An initial portion of the frame transmitted in the paging channel may include a slot descriptor block, which indicates if there is any information in a subsequent payload portion of the frame. Although the slot descriptor block may indicate there is no information in the payload for the mobile communication device, the mobile communication device would typically continue receiving at least some of the subsequent portion of the frame to receive embedded pilot symbols for channel estimation. However, by using various embodiments of the invention, the mobile communication device may be able to shut the receiver off without having to receive beyond the slot descriptor block for additional embedded symbols.

Referring to FIG. 1, there is shown a block schematic diagram 100 of a mobile communication device, in accordance with an embodiment of the invention. The mobile communication device includes a radio frequency transceiver 102 which is coupled to an antenna 104 for transmitting and receiving signals in an air interface 106 between the mobile communication device and a communication system. The transceiver performs all radio frequency operations such as modulation, demodulation, intermediate frequency injection, filtering, and so on, as is known. The air interface describes signal format 107, such as a time division multiple access signal 109, in which a specific time slot 111 is assigned to the mobile communication device. The time slot is one slot of a repeating super frame of a fixed number of time slots. The transceiver 102 is coupled to a baseband processor 108. Whereas the transceiver is sometimes referred to as the "front end," the baseband processor maybe referred to as the "back end." The baseband processor performs signal processing, including coding and decoding functions, error correction, symbol extraction, and controls the transceiver by determining frequency and timing error and feeding the error to the transceiver to make corrections. The baseband processor is coupled to a controller 110 which acts as an application processor for executing and controlling higher layer processes, in accordance with instruction code stored in a memory 112. The controller operates a user interface 122, via a number of input and output means 124, including, for example, a graphical display element 126, keypad/button elements 128, and audio elements 130. The mobile communication device further comprises an audio processor 114, which is coupled to a speaker 118 and a microphone 120. The speaker 118 may be, for example, an earpiece speaker of the mobile communication device for the user to listen to voice signals received during a call. The audio processor converts analog audio signals received via the microphone to digital signals which are passed to the baseband processor. The audio processor also receives digital audio signals from the baseband processor, and coverts them to analog signals to be played over the speaker 118.

Figure 2:
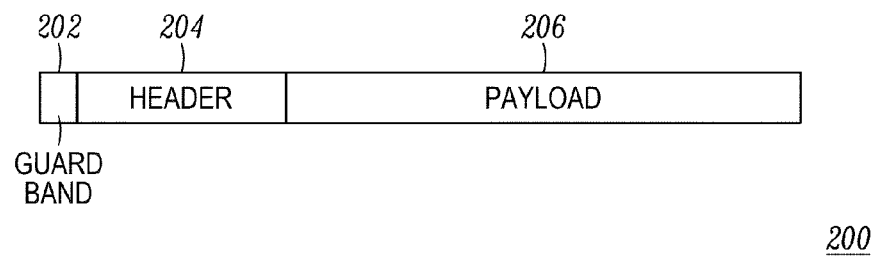
FIG. 2 shows a diagram of a received frame, in accordance with an embodiment of the invention.

The mobile communication device receives signals organized, for example, in frames, as shown in FIG. 2. The frame illustrated in FIG. 2 may represent the information received in one time slot. A frame 200 may be formatted to include a guard portion 202, a header 204, and a payload 206. The guard portion separates the frame from a previous frame and indicates to the receiving mobile communication device that information follows. The header 204 contains data used by the mobile communication device, which is typically not intended to be converted to any perceivable form for the user of the mobile communication device. The header may include a slot descriptor block, for example, which describes, generally, the content of the payload 206. The slot descriptor block occurs in an initial portion of the frame, and informs the mobile communication device as to the contents of the remaining portion of the frame or the payload. To perform channel estimation, pilot symbols may be transmitted in the slot descriptor block concurrently or substantially concurrently on two or more frequency diverse sub-channels.

Figure 3:
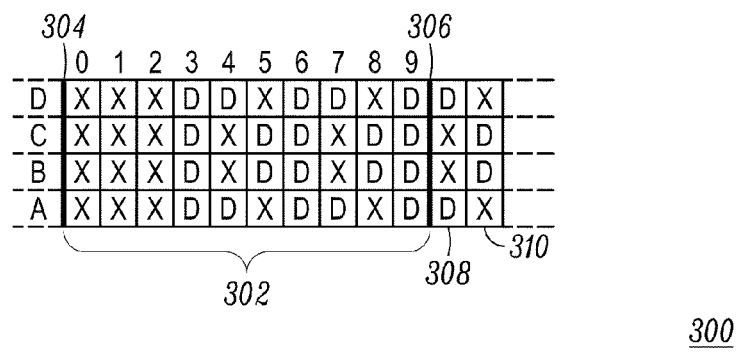
FIG. 3 shows a subchannel diagram with concurrent expected symbols, in accordance with an embodiment of the invention.

FIG. 3 shows a subchannel diagram 300 with concurrent expected symbols, in accordance with an embodiment of the invention. The channel is comprised of a plurality of frequency diverse subchannels, labeled here A, B, C, and D, indicating four subchannels in the present example. The subchannels are separated from each other in frequency, and may contain a quadrature amplitude modulated (QAM) signal. According to the present example, a slot descriptor block 302 begins at time 304 and ends at time 306. The slot descriptor block is organized into baud slots, numbered 0-9, and contains data or expected symbols, indicated by D or X, respectively. The expected symbols may be pilot symbols or color code symbols, and are known to the mobile communication device. The expected symbols are used by the mobile communication device to perform channel estimation. The expected symbols occur concurrently or substantially concurrently with expected symbols in the other subchannels. For example, in baud positions 0-2, all subchannels carry expected symbols. In baud position 4, subchannels B, C carry concurrent expected symbols, while in baud position 5 subchannels A,D carry concurrent expected symbols, and so on. The expected symbols may be referred to as pilot symbols, or they may be color code symbols or any other known and expected symbols. The symbols are concurrent with respect to order or position. Under ideal circumstances, with no fading across the subchannels, the symbols would occur concurrently with respect to time, as well. If there is fading across the subchannels, meaning one or more subchannels are delayed with respect to each other, then the symbols will not be precisely concurrent in time. Therefore, the symbols are positionally concurrent, and it is expected they will be substantially concurrent in time, but due to fading there may be slight temporal differences from subchannel to subchannel. It should be noted that after the end of the slot descriptor block 306, expected symbols still occur in the subchannels, and are conventionally used for pilot symbol interpolation with symbols occurring during the slot descriptor block. Due to the need to perform pilot symbol interpolation, under conventional operation, even if the slot descriptor block indicates there is no information in the payload, the mobile communication device must continue receiving beyond the slot descriptor block to receive more of the expected or pilot symbols. However, according to the invention, the mobile communication device can shut down the receiver after the termination of the slot descriptor block, rather than perform further receiving, if the fading across channels is within a prescribed range.

The invention includes an algorithm for measuring the fading across subchannels. In one embodiment of the invention, the fading is measured by performing or otherwise measuring subchannel fading channel cross correlation between subchannels during a slot descriptor block portion of channel time slot, as shown, for example, in FIG. 3. A vector may be created as follows:

$$\text{num\_pairs} = [\Delta_0, \Delta_1, \ldots \Delta_n]$$

where $\Delta_n$ indicates the number of concurrently available symbol pairs between sub-channels that are n sub-channels apart. Thus, $\Delta_0$ is the total number of available pilot symbols, $\Delta_1$ indicates the number of symbol pairs on adjacent subchannels, $\Delta_2$ indicates the number of symbol pairs that are two sub-channels apart, and so on. For a given baud position, a vector of cross correlation measurements may be formed from $$\hat{x}(|i-n|) = \frac{1}{\text{num\_pairs}(|i-n|)} \sum_{\text{pairs at } \Delta = |i-n|} \left( \frac{r_{i,k} \cdot u_{i,k}^*}{|u_{i,k}|^2} \right) \left( \frac{r_{n,k} \cdot u_{n,k}^*}{|u_{n,k}|^2} \right)^*,$$

where all pairs associated with a particular subchannel delta |i−n| are summed, and u(n,k) are the known complex symbol values at symbol times n and subchannels k, and r(n,k) are the corresponding complex received matched filter output samples at symbol times n and subchannels k. Then the average of the position cross correlations over a large number of positions N is determined by $$\hat{\rho}(i) = \hat{\rho}(i) + \frac{1}{N}\hat{x}(i),$$

until all N positions have been received. After analyzing the average $\hat{\rho}(i)$ for high delay spread conditions, the average is reset, the process repeated. Thus. measured cross correlations may be used to classify the delay spread, or fading, of the current channel. The fading may be classified as high if, for example:

$$\max[|\hat{\rho}(1)||\hat{\rho}(2)||\hat{\rho}(3)|] > \eta \cdot \min[|\hat{\rho}(1)||\hat{\rho}(2)||\hat{\rho}(3)|].$$

Generally, the preceding equation indicates disparity. A fixed threshold $\eta$ is used to classify the current channel condition. Note that as $\eta$ is increased, the channel is less likely to be characterized as having a high delay spread. Also note that the measurement $\hat{\rho}(0)$ is not used.

Thus, the present fading of the channel may be determined by performing cross correlations measurements among concurrent expected symbols such as pilot symbols, for example. The cross correlations may be performed by the baseband processor as the symbols are received. If the fading is within the preselected range, the receiver may be shut off at the end of, for example, the slot descriptor block, before the additional pilot symbols are received, and before the end of the channel time slot. Alternatively, the fading measurement may be averaged and used to determine if the shortened receive window may be used. Or the fading may be used to determine the receiver on-time of a subsequent receive window.

Figure 4:
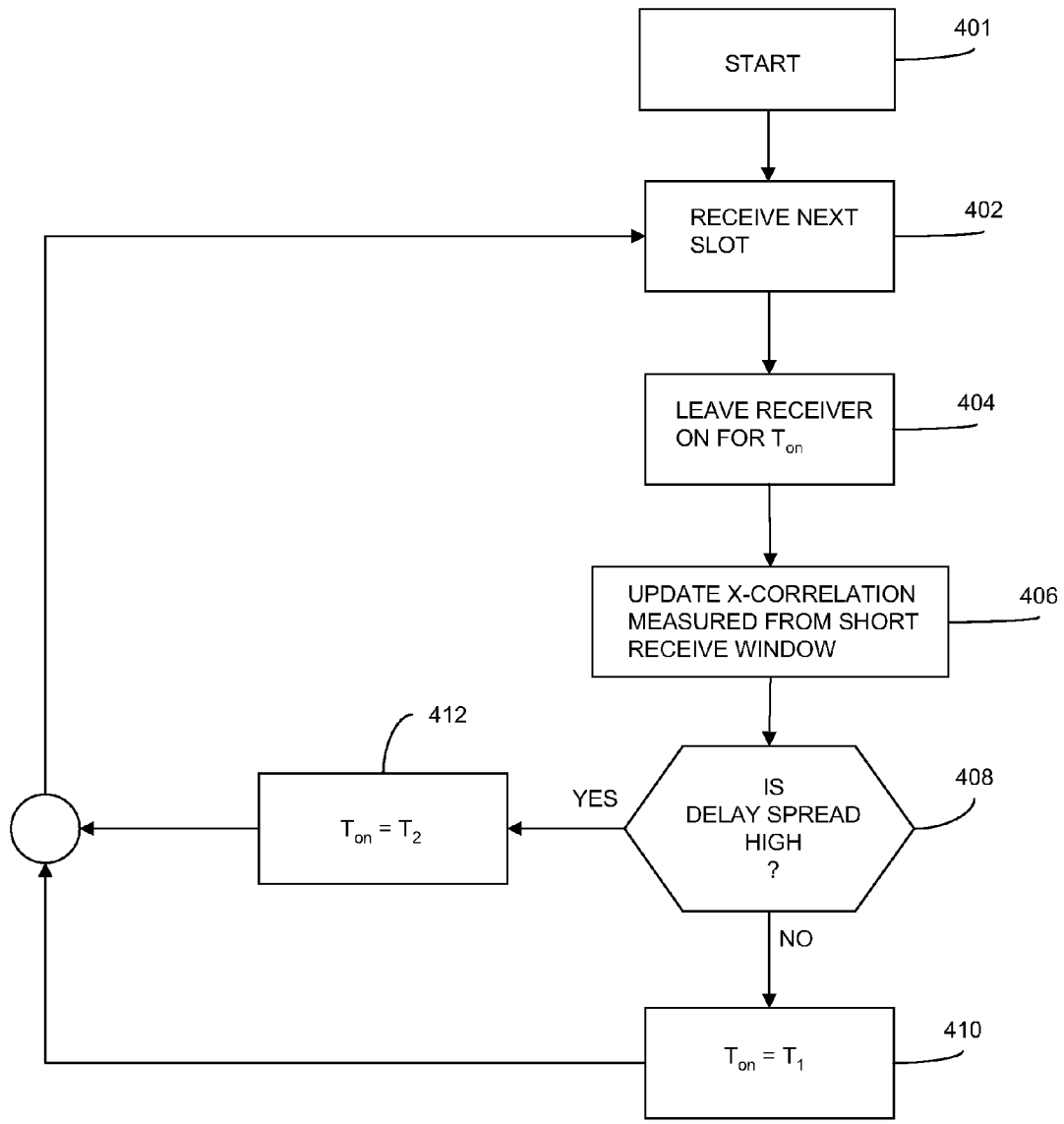
FIG. 4 shows a flow chart diagram of a method of operating a mobile communication device, in accordance with an embodiment of the invention.

Referring now to FIG. 4, there is shown a flow chart diagram 400 of a method of operating a mobile communication device, in accordance with an embodiment of the invention. At the start 401 of the method, the mobile communication device is powered up, and associated with a communication system via a base station of a present serving cell. The base station transmits a paging channel to page mobile communication devices presently associated with the base station of incoming calls. The only way for the mobile communication device to know if there is an incoming call is to periodically check the paging channel. Typically the mobile communication device will be assigned to a particular time slot in a repeating sequence of time slots in a time division multiple access system.

Since one goal of the mobile communication device is to conserve battery power, the mobile communication device typically places its receiver in a low power or 'sleep' mode. At the prescribed time, the mobile communication device must therefore wake up the receiver so that it is tuned to the channel of interest in time to receive the signal. Accordingly, once the receiver is powered up and ready to receive, it commences receiving the information at the assigned time slot or assigned logical channel 402. The device programs a receiver timer to a given minimum period of time for the receiver to be on, $T_{on}$ or on-time at 404. The receiver on-time is based on the fading measurement of the previously received time slot, as shall be seen.

The signal is a composite signal comprising a plurality of frequency diverse subchannels. The subchannels may be centered on successively adjacent frequency bands. Embedded in each subchannel are expected symbols such as pilot or color code symbols. These symbols are arranged to appear in concurrent positions of the frame, although they may occur offset in time due to fading. During the receive time, the receiver begins receiving data organized in a frame. During an initial portion of the frame, the mobile communication device commences measuring the present fading across the frequency diverse subchannels 406.

The fading indicates the degree of fading among the various frequency diverse subchannels. The mobile communication device then determines if the measured fading is within an acceptable range 408. If the present fading is acceptable, the mobile communication device then sets $T_{on}$ to $T_1$ at 410, otherwise $T_{on}$ is set to $T_2$ at 412. The two time periods $T_1$ and $T_2$ are selected to correspond to the length of the slot descriptor block only, and the length of the slot descriptor block and additional baud positions, respectively. That is, $T_2$ is longer than $T_1$. Thus, if the present fading is sufficiently low, channel estimation may be performed within the length of the slot descriptor block, but as the fading increases, then additional information must be received to perform channel estimation. The receiver may, in one embodiment of the invention, be shut off at a time determined by the previous time slot's fading. The method illustrated here assumes also that the slot descriptor block indicates there is no data in the payload. If the slot descriptor block indicates there is data in the payload, then the device maintains the receiver on to continue receiving regardless of the fading of the previous time slot to receive the data. It should be noted that the receiver in a present time slot may be shut off independently of steps 408-412. In other words, determining the fading and setting the receiver timer to the appropriate time value does not necessarily have to be performed while receiving the information.

Furthermore, it is contemplated that the present fading of a presently received time slot may be used to shut off the receiver during the present time slot. That is, if the present fading, as measured while in the process of receiving a present time slot, indicates sufficiently low fading, then the mobile communication device may shut off the receiver during the present time slot at the end of the present slot descriptor block.

Thus, the invention includes a method of selecting a receiver on-time for receiving a portion of an assigned time slot, commenced by measuring the fading of a signal received during the portion of the assigned time slot (406). The fading measurement may be performed by determining cross correlations between substantially concurrent expected symbols occurring in a plurality of frequency subchannels. If the fading measurement is within a prescribed range, the method commences setting the receiver on-time for a subsequent time slot to a short receiver on-time. If the fading measurement is not within the prescribed range, however, the receiver commences setting the receiver on-time for the subsequent time slot to a long receiver on-time.

Although the invention is shown here with the present fading measurement being used to determine the receiver on-time of a subsequent paging channel time slot, those skilled in the art will realize there are a variety of ways of implementing the invention without departing from the scope of the invention. In particular, in one alternate embodiment, it is contemplated that the present fading measurement dictates the receiver on-time for the present paging channel time slot. It is also contemplated the mobile communication device maintain a running average of fading measurements to determine the receiver on-time for a paging channel time slot. The running average may simply be the most recent and the present fading measurements, or several previous measurements, and the averages may be weighted such that, for example, the most recent fading measurements affect the average more. Generally, the receiver on-time is based at least in part on either the present fading measurement or a previous fading measurement, or both.

Figure 5:
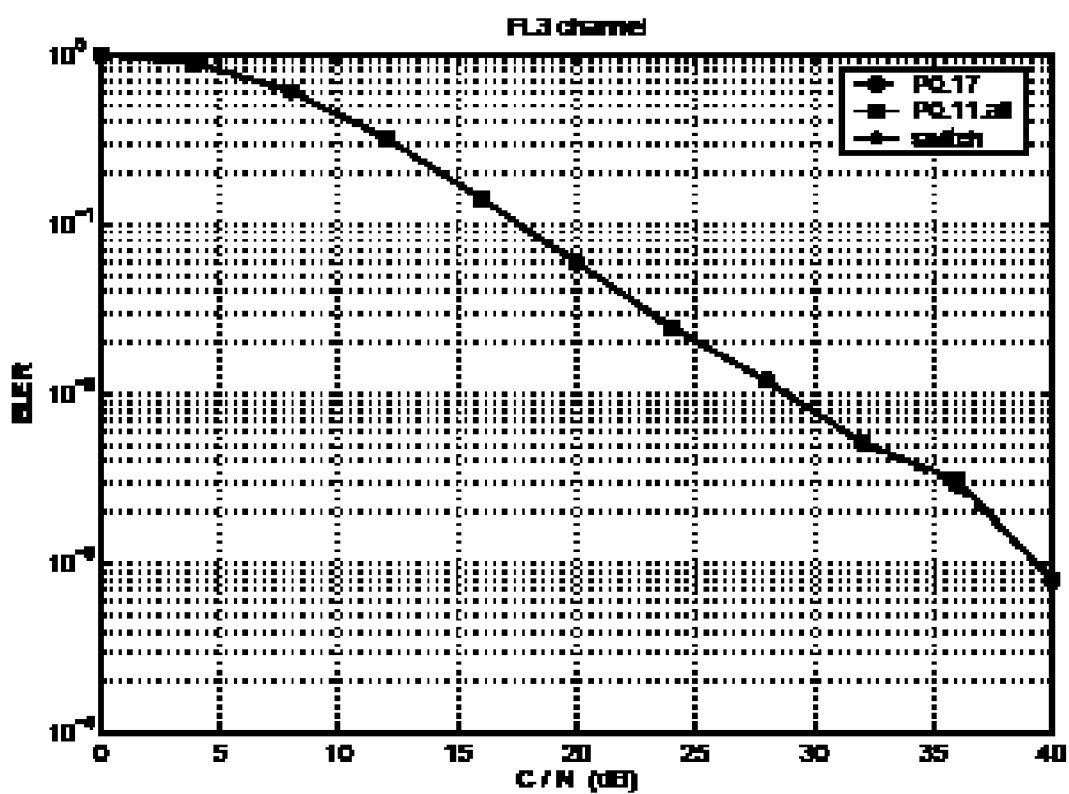
FIGS. 5 and 6 show simulation results of a system using the invention, in accordance with one embodiment of the invention.

Referring now to FIG. 5, there is shown a simulation result of a system using the invention, in accordance with one embodiment of the invention. The present simulation used flat fading at 3 miles per hour. There are three plots shown; "P0.17," "P0.11.all," and "switch." P0.17 shows performance of block error rate (BLER) average vs. improving carrier to noise (C/N) conditions while receiving 17 baud symbols for channel estimation. P0.11.all shows the effect of receiving only 11 baud symbols, and "switch" shows the operation of the present invention which may switched between using the long receiver on time and the shortened receiver on time, corresponding to receiving 17 or 11 baud symbols, respectively. Since the fading is flat in FIG. 5, there is no delay spread, and all three curves track the same performance.

Figure 6:
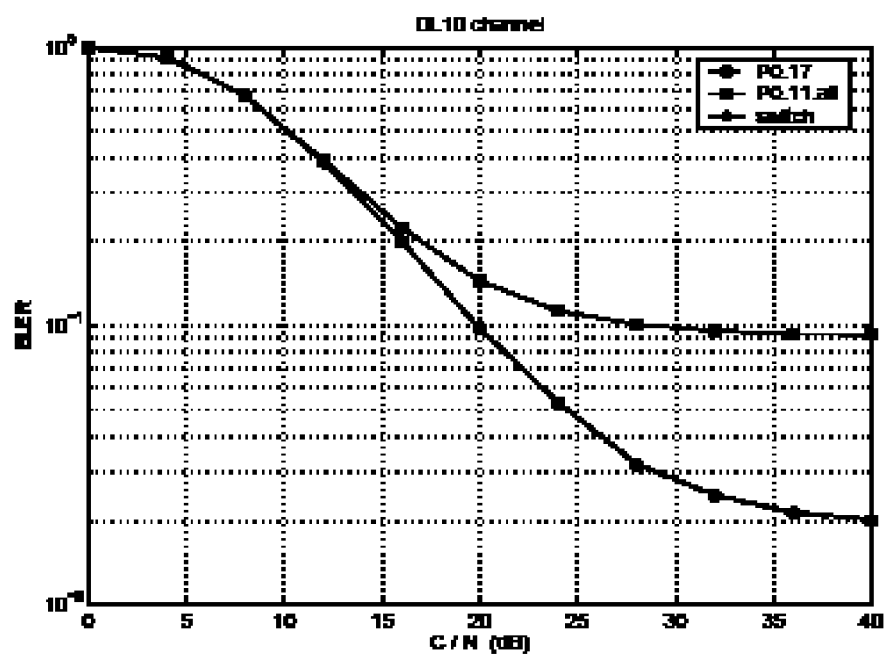

Referring now to FIG. 6, there is shown a simulation result of a system using the invention, in accordance with one embodiment of the invention. The present simulation uses two ray fading at 35 miles per hour, with a root mean square delay spread of 10 microseconds. The P0.17, P0.11.all, and switch represent the same operations as in FIG. 5. However, with delay spread introduced into the simulation, it can bee seen that as the C/N ratio improves, with the shortened on time fixed for 11 baud slots, the BLER doesn't improve with the fixed long receiver on time curve (P0.17). By using the invention, however, as indicated by the "switch" curve, performance tracks the long on-time curve. Thus, the invention provides equivalent performance in channel estimation, but also provides a battery current drain savings by using the short receiver on-time when appropriate, as dictated by the delay spread.

Thus, the invention provides a method of reducing receiver power consumption in a mobile communication device while in stand by mode, commenced upon powering up the receiver at the start of a paging channel time slot and receiving an initial portion of a present frame of data transmitted during the present paging channel time slot. The frame includes a slot descriptor block. The frame is organized over a plurality of frequency diverse subchannels, each of which contain a plurality of concurrent or substantially concurrent expected symbols. By substantially concurrent it is meant that the expected symbols occur in the same baud position in the frequency diverse subchannels, although they may be offset in time due to fading across the subchannels. The mobile communication device commences demodulating the slot descriptor block, and measuring a delay spread of the subchannels based on the plurality of concurrent expected symbols. If the delay spread is within a preselected range and the slot descriptor block indicates there is no incoming page for the mobile communication device, then reception is terminated and the receiver shut off at the end of the slot descriptor block to conserve power.

The invention also provides a method of measuring a present delay spread of a channel including a plurality of frequency diverse subchannels, where each of the subchannels includes a plurality of concurrent expected symbols. At least one of the concurrent expected symbols in each of the subchannels occurs concurrently with a concurrent expected symbol on at least one other subchannel. The method commences by performing cross correlations of concurrent expected symbols occurring on different ones of the plurality of subchannels, and summing the results the cross correlations to provide a cross correlation sum. The cross correlation sum indicates the delay spread.

Furthermore, the invention provides a method of operating a mobile communication device which involves powering up a receiver of the mobile communication device substantially immediately prior to an onset of a channel time slot, and receiving a composite signal during at least an initial portion of the channel time slot. The composite signal includes a plurality of frequency diverse subchannels, which contain concurrent expected symbols. The expected symbols occur concurrently with expected symbols on the other subchannels. The mobile communication device commences measuring a delay spread of the subchannels based on the concurrent expected symbols. If the delay spread meets a predefined criteria, the mobile communication device commences shutting off the receiver prior to an end of the channel time slot.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of reducing receiver power consumption in a mobile communication device while in stand by mode, comprising:

powering up the receiver substantially at the start of a first paging channel time slot;

receiving a frame of data transmitted during the first paging channel time slot, including receiving a first slot descriptor block in an initial portion of the frame of data, and including receiving a first plurality of frequency diverse subchannels, the subchannels having a plurality of substantially concurrent expected symbols occurring in a plurality of predefined baud intervals of the first slot descriptor block and also occurring on at least two of the frequency diverse subchannels for a given baud interval;

performing a plurality of cross correlations of the plurality of substantially concurrent expected symbols occurring on at least two frequency diverse subchannels for each of the plurality of predefined baud intervals and summing the results of the plurality of cross correlations to provide a cross correlation sum;

receiving a second slot descriptor block of a second paging channel time slot, wherein the second paging channel time slot is subsequent to the first paging channel time slot; and when the cross correlation sum is above a preselected threshold and the first slot descriptor block indicates there is no more information to receive, terminating reception of the second paging channel time slot after the receiving the second slot descriptor block of the second paging channel time slot, and shutting off the receiver.

2. A method of reducing receiver power consumption as defined in claim 1, wherein the summing comprises maintaining a separate cross correlation sum for each of:

cross correlations performed on subchannels on adjacent frequency bands;

cross correlations performed on subchannels separated by one frequency band; and cross correlations performed on subchannels separated by two frequency bands.

3. A method of reducing receiver power consumption as defined in claim 1, wherein the substantially concurrent expected symbols are pilot symbols.

4. A method of reducing receiver power consumption as defined in claim 1, wherein the substantially concurrent expected symbols are color code symbols.

5. A method of reducing receiver power consumption as defined in claim 1, wherein terminating reception of the second paging channel time slot is based on a running average of the first cross correlation sum and at least one previous cross correlation sum of at least one third paging channel time slot, wherein the third paging channel time slot is prior to the first paging channel time slot.

6. A method of reducing receiver power consumption as defined in claim 1, wherein terminating reception of the second paging channel time slot is based only on the first cross correlation sum.

7. A method of reducing receiver power consumption as defined in claim 1, wherein the first cross correlation sum determines a second receiver on-time for receiving the second paging channel time slot.

8. A method of operating a mobile communication device, comprising:
- powering up a receiver of the mobile communication device substantially at the onset of a first channel time slot of a first paging channel time slot assigned to the mobile communication device;
- receiving a composite signal during the first channel time slot, the composite signal comprised of a plurality of frequency diverse subchannels, the subchannels containing substantially concurrent expected symbols occurring at a plurality of predefined baud intervals of the first channel time slot, each of the substantially concurrent expected symbols occurring on at least two frequency diverse subchannels for a given baud slot;
- measuring a first fading of the plurality of frequency diverse subchannels by performing a plurality of subchannel fading cross correlations on the substantially concurrent expected symbols occurring on the at least two frequency diverse subchannels for each of the plurality of predefined baud intervals and summing the results of the plurality of subchannel fading cross correlations to provide a cross correlation sum that indicates the first fading;
- receiving a second channel time slot of the first paging channel time slot, wherein the second channel time slot is subsequent to the first channel time slot; and
- shutting off the receiver prior to an end of the second channel time slot upon determining the first fading is above a preselected threshold and a second slot descriptor block of the second channel time slot indicates the payload is empty.

9. A method of operating a mobile communication device as defined in claim 8, wherein the summing comprises maintaining a separate cross correlation sum for each of:
- cross correlations performed on subchannels on adjacent frequency bands;
- cross correlations performed on subchannels separated by one frequency band; and
- cross correlations performed on subchannels separated by two frequency bands.

10. A method of operating a mobile communication device as defined in claim 8, wherein the concurrent expected symbols are pilot symbols.

11. A method of operating a mobile communication device as defined in claim 8, wherein the concurrent expected symbols are color code symbols.

* * * * *